United States Patent [19]
Willden et al.

[11] Patent Number: 5,242,523
[45] Date of Patent: Sep. 7, 1993

[54] CAUL AND METHOD FOR BONDING AND CURING INTRICATE COMPOSITE STRUCTURES

[75] Inventors: Kurtis S. Willden, Kent; Kenneth N. Goodno, Federal Way, both of Wash.

[73] Assignee: The Boeing Company, Seattle, Wash.

[21] Appl. No.: 882,831

[22] Filed: May 14, 1992

[51] Int. Cl.⁵ .............................................. B29C 65/00
[52] U.S. Cl. ................................... 156/285; 156/245; 156/297; 156/500; 244/119; 244/125
[58] Field of Search .................... 244/119, 125, 123; 156/285, 297, 245, 286, 299, 300, 500; 264/511, 510, DIG. 64, 263, 278, 279.1; 52/793, 806, 807; 425/500, 501, 504, 111, 123, 393, 383

[56] References Cited
U.S. PATENT DOCUMENTS

| | | | |
|---|---|---|---|
| 2,715,596 | 8/1955 | Hawley | 156/297 |
| 2,749,266 | 6/1956 | Eldred | 156/193 |
| 4,086,378 | 4/1978 | Kam et al. | 156/245 |
| 4,908,254 | 3/1990 | Fischer et al. | 244/119 |

*Primary Examiner*—Caleb Weston
*Assistant Examiner*—Robert W. Robey
*Attorney, Agent, or Firm*—Glenn D. Bellamy; Bruce A. Kaser

[57] ABSTRACT

The invention disclosed here is a method for forming and curing an intricate structure of criss-crossing composite stringers and frames that are bonded to a skin panel. A structure constructed in accordance with the invention would be well-suited for use as a portion of an aircraft fuselage, a boat hull, or the like. The method is preferably practiced by applying uncured composite stringers to an uncured composite sheet panel. This is followed by placing cured frames crosswise over the stringers. The frames have openings at the locations where they intersect with the stringers which enables the frames to come into direct contact with the skin along most of their length. During the forming and curing process, the stringers are covered with a plurality of cauls, and the entire assembly of skin panel, stringers, frames and cauls is subjected to a vacuum bagging and curing process. The cauls serve to maintain both part shape and to control the flow of resin within the stringers as they are cured. Further, they probably eliminate the need for intermediate protective materials between the vacuum bag and the stringers.

10 Claims, 13 Drawing Sheets

CAUL AND METHOD FOR BONDING AND CURING INTRICATE COMPOSITE STRUCTURES

Government Contracts

The subject matter of the present invention was conceived and developed during the course of work done by The Boeing Company under NASA Contract No. NAS1-18889, and is consequently subject to the provisions of 42 U.S.C. §2457.

TECHNICAL FIELD

The invention disclosed and claimed here generally relates to methods of forming parts from composite materials, and more particularly, to caul plates and mandrels which are used to form such parts during vacuum bagging and heat-curing processes.

BACKGROUND OF THE INVENTION

The term "composite" material would be very familiar to most engineers working in the aircraft or aerospace industries. There, composite materials are generally described as being materials that consist of fibers, such as graphite fibers, for example, embedded in a resinous matrix.

Because it is a lightweight metal, aluminum has traditionally been the material of choice for making the bulk of aircraft parts. However, since composites are even lighter, and have a better strength-to-weight ratio when compared to aluminum, aircraft designers have long been aware of the desirability of increasing the use of composites in aircraft structures. This has resulted in ongoing research and development activities directed to the development of new techniques for forming, curing and bonding composites into desired part shapes.

The "Stealth" aircraft developed by and for the military may provide the first and best example of large-scale composite usage for producing both aircraft fuselage and wing structures. However, it seems that composites were used there primarily because of their ability to reduce radar detection, as opposed to their superior material characteristics and what such characteristics could mean with respect to aircraft performance. Presently, there is an ongoing effort to produce large sections of conventional aircraft completely from composites. In particular, The Boeing Company, who is the assignee of the invention disclosed here, has been involved in producing a fuselage or "crown" panel section completely and solely from composite parts where the parts are bonded together as opposed to using other, more conventional fastening techniques.

It is relatively easy to produce composite skin panels, stiffeners or stringers, and circular frame members that define the curvature of a fuselage panel section. The problem lies in joining these various parts together as an intricate structure of criss-crossing frames and stringers, all of which are bonded to the skin panel.

Up to the present, producing such a structure is difficult at best, at least when conventionally-known methods for curing and bonding composites are used. Generally, conventional methods involve a high degree of labor, require non-reusable materials for forming and curing, and are very susceptible to cure failures.

Most or all composite parts are presently formed using a vacuum bag for pressing the uncured composite against a mandrel, and thereafter curing the composite at high temperature. Generally, some sort of intermediate materials must be positioned between the vacuum bag and the uncured composite, in order to avoid fouling the surface of the bag so that it is otherwise re-usable for forming other parts. With respect to the crown panel structure described above, positioning such protective materials between the bag and both the stringers and frame members is highly labor-intensive, and is not conducive to mass production or an automated process. Further, in order to reduce warpage and stress, it is desirable to co-cure the skin panel and stringers simultaneously. This creates technical problems with respect to the control of part shape as the stringers are pressed and cured against the skin panel, and with respect to controlling resin flow outwardly from the stringers.

It is these kinds of problems that the present invention addresses, and it is believed that the present invention makes the fabrication of intricate composite structures more practical from both a technical and economical standpoint.

SUMMARY OF THE INVENTION

The present invention is an improved method for making intricate composite structures, and involves the use of an improved caul for controlling part shape and resin flow for certain parts of the structure as it is formed and cured. The method in accordance with the invention involves first placing the skin panel upon a tooling surface which, in most cases, will be curved in order to correspond to the curvature of the structural panel which is to be formed. The skin panel is made of a conventional composite material such as graphite/epoxy, for example, and is probably uncured at the time it is placed on the tooling surface.

Thereafter, a plurality of stringers or stiffeners are laid across the skin panel on top of pre-positioned layers or strips of an adhesive or bonding substance that, upon curing of the panel, fixedly bonds the stiffeners to the panel. Like the panel, all of the stiffeners are made of a composite material, and are probably uncured at the time they are initially laid upon the skin panel.

A plurality of frame members are thereafter laid onto the panel, but crosswise of the stiffeners. All of the frame members have openings at the locations where they intersect the stiffeners. Such openings are sized for receiving at least the cross-section of each stiffener, so that the majority of the length of each frame will directly contact the skin panel.

The frame members are spaced apart in a manner so as to define stiffened panel sections between them, or in other words, a stiffened panel section is defined between every two frame members. Like the stiffeners, the frame members are bonded to the skin panel by a layer of a bonding substance that is pre-positioned between each frame and the surface of the skin panel. Unlike the stringers and panel, the frame members are probably pre-cured.

After the stiffeners and frame members are laid across the skin panel, a plurality of flexible cauls in accordance with the invention are laid over the stiffeners. This step generally includes placing a single or individual caul over each stiffened panel section between every set of two frame members, and end cauls over stiffener portions which extend beyond the outermost frame members. The cauls define the outer part shape of substantially all portions of the stiffeners which underlie them. Preferably, an elongated mandrel is also placed under each stiffener for defining the inner part shape thereof.

Thereafter, a vacuum bag is placed over the entire assembly just described and the bag is evacuated. The bag presses the frame members against the skin panel, and simultaneously presses against the cauls causing them to press the stiffeners against the skin panel. The entire assembly is heat-cured, which simultaneously cures or co-cures the stiffeners and the skin panel together, and at the same time, bonds the frame members to the skin panel, thereby forming a finished structural panel.

Each caul that is used in the above-described method is made of a flexible material, such as high-temperature rubber, for example, which presses directly against both the stiffeners and the skin panel. Bonded to the outer side of such material is a reinforcing material, which is made of a composite material. The reinforcing material is joined to and arranged relative to the flexible material in a manner so that it stiffens and controls the flexible material, and causes it to maintain the part shape of the stringers as the caul is pressed against each stringer, and while each stringer is subsequently cured.

Although, in preferred form, the reinforcing material is more or less a substantially continuous layer of material across the top of the flexible rubber, the peripheral edges of each caul do not have any significant reinforcement, and may consist solely of the flexible material. This enables the cauls to abut against the frame members in a sealing fashion during the vacuum bagging process for controlling resin flow.

Each caul essentially has upraised recesses that surround and fit about the stringers, and closely follow the net part outline of each stringer's outer surface. The surface of the rubber is smooth adjacent these recessed areas and seal off the stringers inside the recesses during the forming and curing process. The reinforcing material around the recess, on the outer side of the flexible material which makes up the caul, otherwise ensures that there will be little resin flow within the thickness of the stringer walls as they are cured.

A panel made in the above-described way would be well-suited for use as a crown panel section in the fuselage of an aircraft, or for other fuselage sections, or it would likewise be well-suited for use as a portion of a boat hull. The invention as briefly summarized above will become better understood upon review of the following detailed description which is to be taken in conjunction with the appended drawings.

BRIEF DESCRIPTION OF THE DRAWINGS

In the drawings, like reference numerals and letters typically refer to like parts throughout the various views, unless specifically indicated otherwise, and wherein.

BEST MODE FOR CARRYING OUT THE INVENTION

Figure 1:
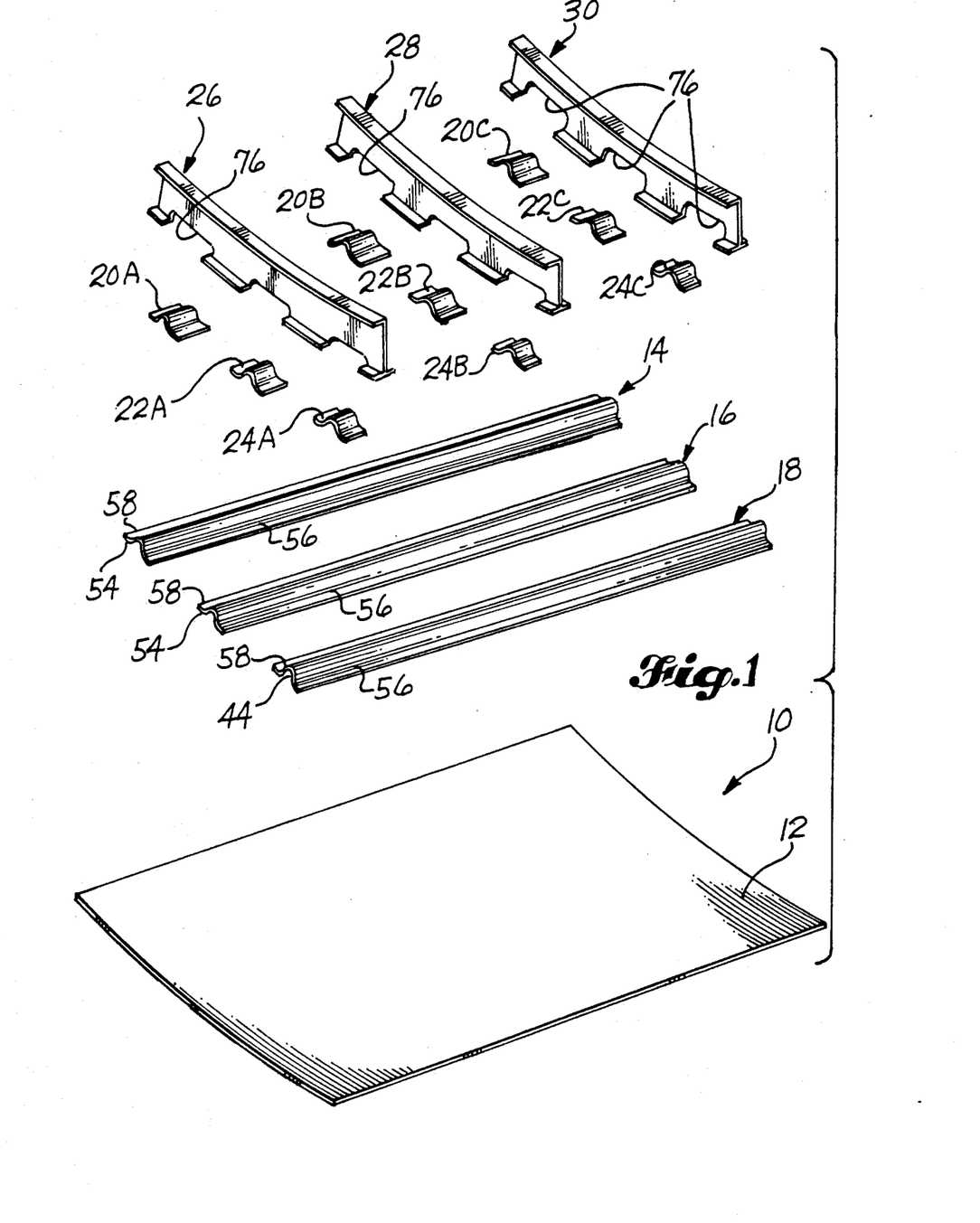
FIG. 1 is an exploded view of a fuselage crown panel section made completely of composite parts in accordance with the invention.
Figure 2:
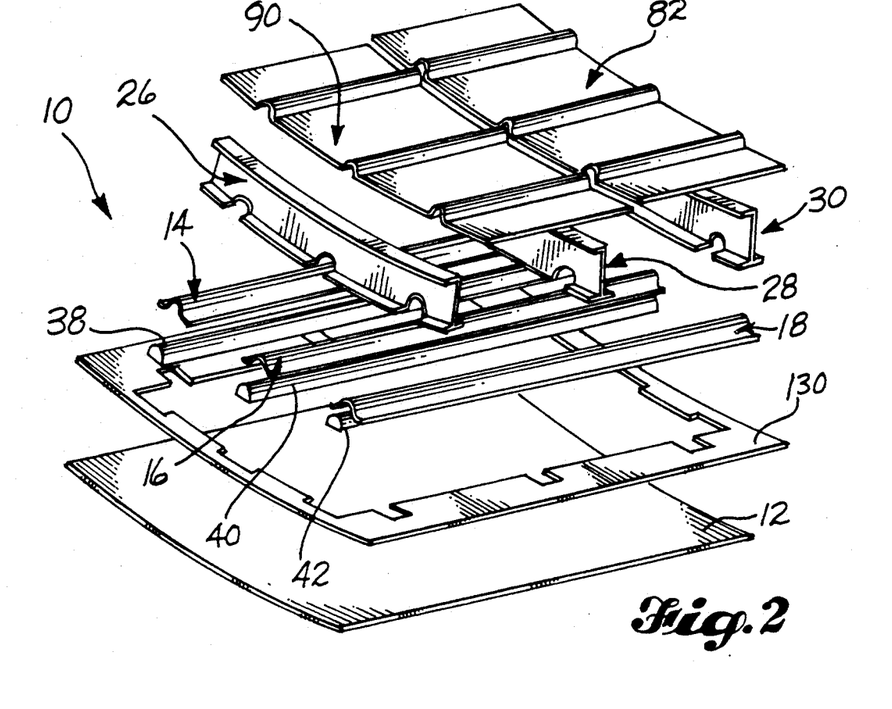
FIG. 2 is an exploded view like FIG. 1, but in addition to showing the various parts which make up the crown panel, FIG. 2 also shows certain tooling in accordance with the invention and how such tooling is used to produce the panel.
Figure 10:
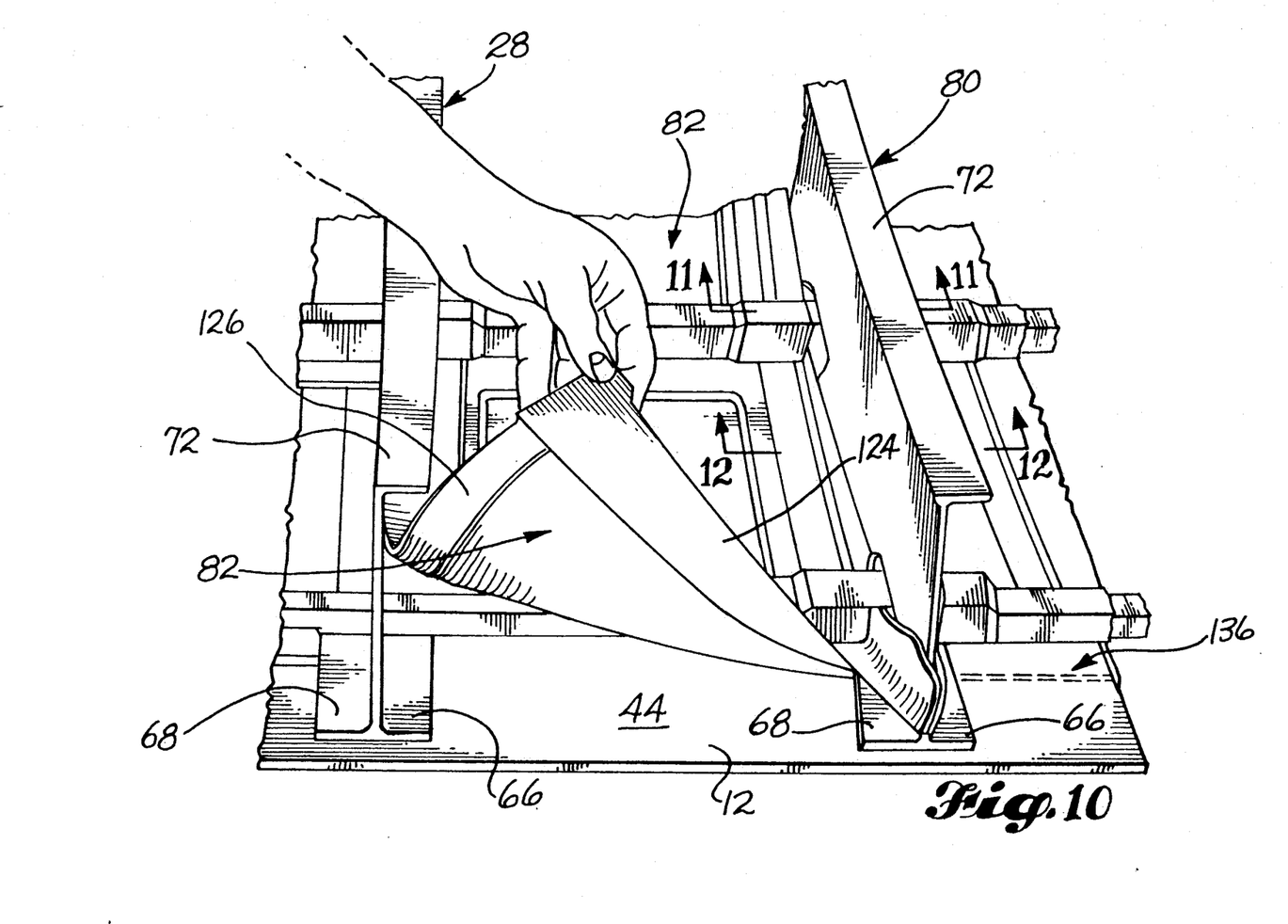
FIG. 10 is a fragmentary pictorial view like FIG. 4, but shows placement of another caul over a stiffened panel section, and in between two frame members, during an intermediate stage of the panel-forming process.

Referring now to the drawings, and first to FIG. 10, shown generally at 10 is an exploded view of a composite panel constructed in accordance with a preferred embodiment of the invention. The panel 10 consists of a relatively thin, skin panel 12; a plurality of panel stiffeners or stringers 14, 16, 18; a plurality of stringer pressure bridges 20a–c, 22a–c, 24a–c; and lastly, a plurality of frame members or curving frames 26, 28, 30. All of these various parts are made of conventional composite materials. Except for the fact that they are composites, their shape and arrangement would be familiar to those having knowledge as to how aircraft structures are generally made.

Figure 3:
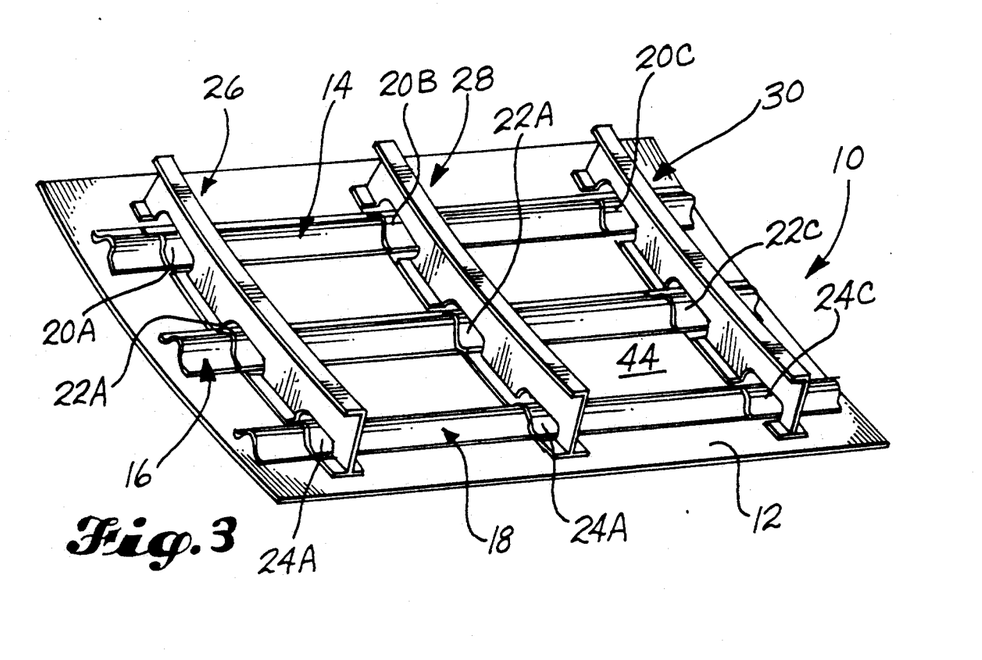
FIG. 3 is a pictorial view of the crown panel shown in FIG. 1.

FIG. 3 shows the panel 10 in its entirety after curing and bonding in accordance with the invention, which will now be described in detail. In accordance with the invention, the skin 12 and stringers 14, 16, 18 will probably be "green" or uncured prior to assembly, although precured parts could be used. The various pressure bridges 20, 22, 24 and the frames 26, 28, 30 are preferably precured prior to assembly.

Figure 16:
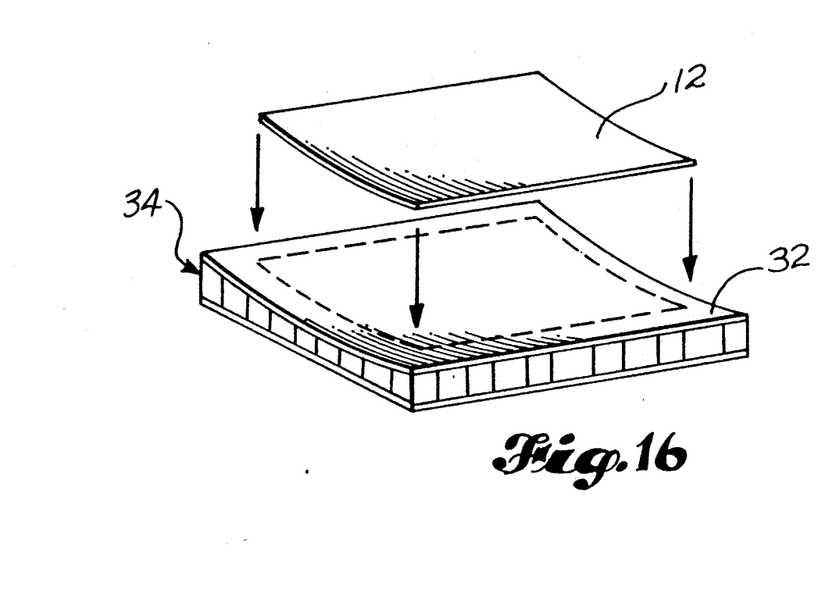
FIG. 16 is the first in a series of four sequential views showing how the panel of FIGS. 1 and 3 is made, and shows placement of a skin sheet or skin panel onto the surface of a panel-forming tool.

Referring now to FIG. 16, these various panel components are bonded together by first placing the skin panel 12 upon the surface 32 of a panel tool 34. Such tooling surface 32 is curved in a manner so that it has the same shape as the curvature of that portion of the aircraft structure in which the panel 10 is to be used. After the skin 12 is placed on the tool 34, the remaining parts making up the panel 10 are then positioned on the skin in the manner described below.

Figure 17:
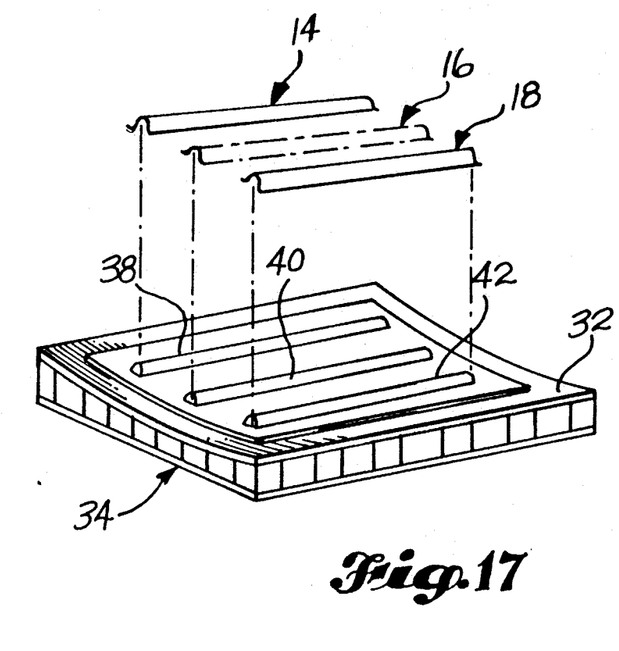
FIG. 17 is the second in a series of four sequential views, and shows placement of mandrels and stringers onto the skin sheet.
Figure 18:
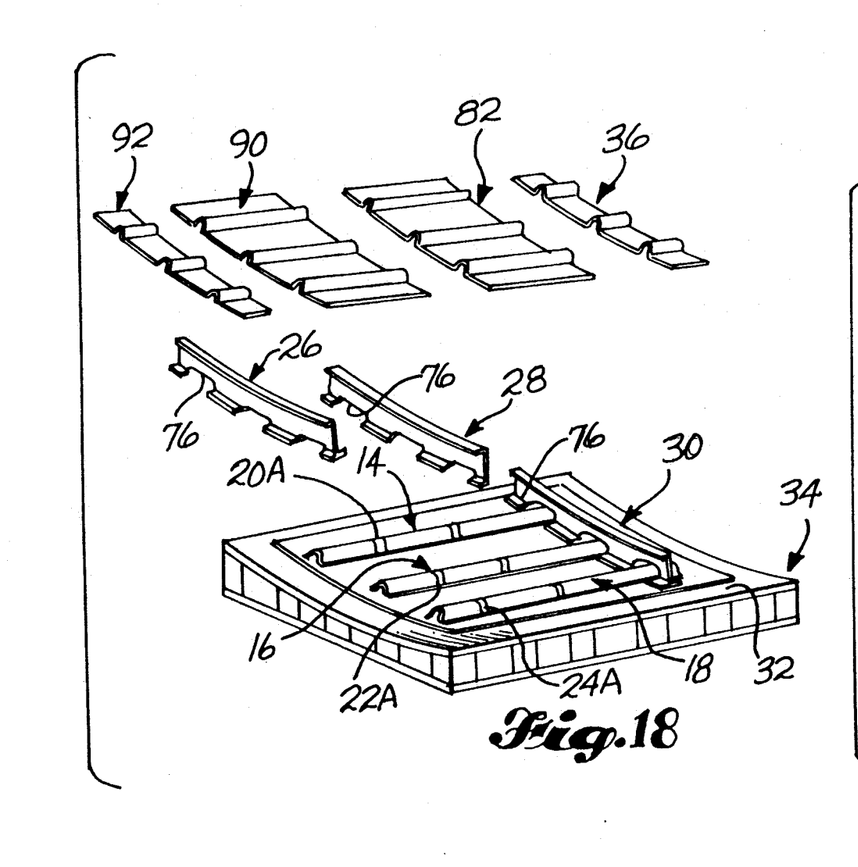
FIG. 18 is the third in a series of four sequential views, and shows placement of pre-cured pressure bridges, frames, and cauls over the stringers and skin.

Referring to FIG. 17, three elongated mandrels 38, 40, 42 are then laid across the top surface 44 of the skin 12. This is followed by placing the stringers 14, 16, 18 over the mandrels. The mandrels 38, 40, 42 define the inner part of the stringers 14, 16, 18 during the panel-forming process.

Figure 4:
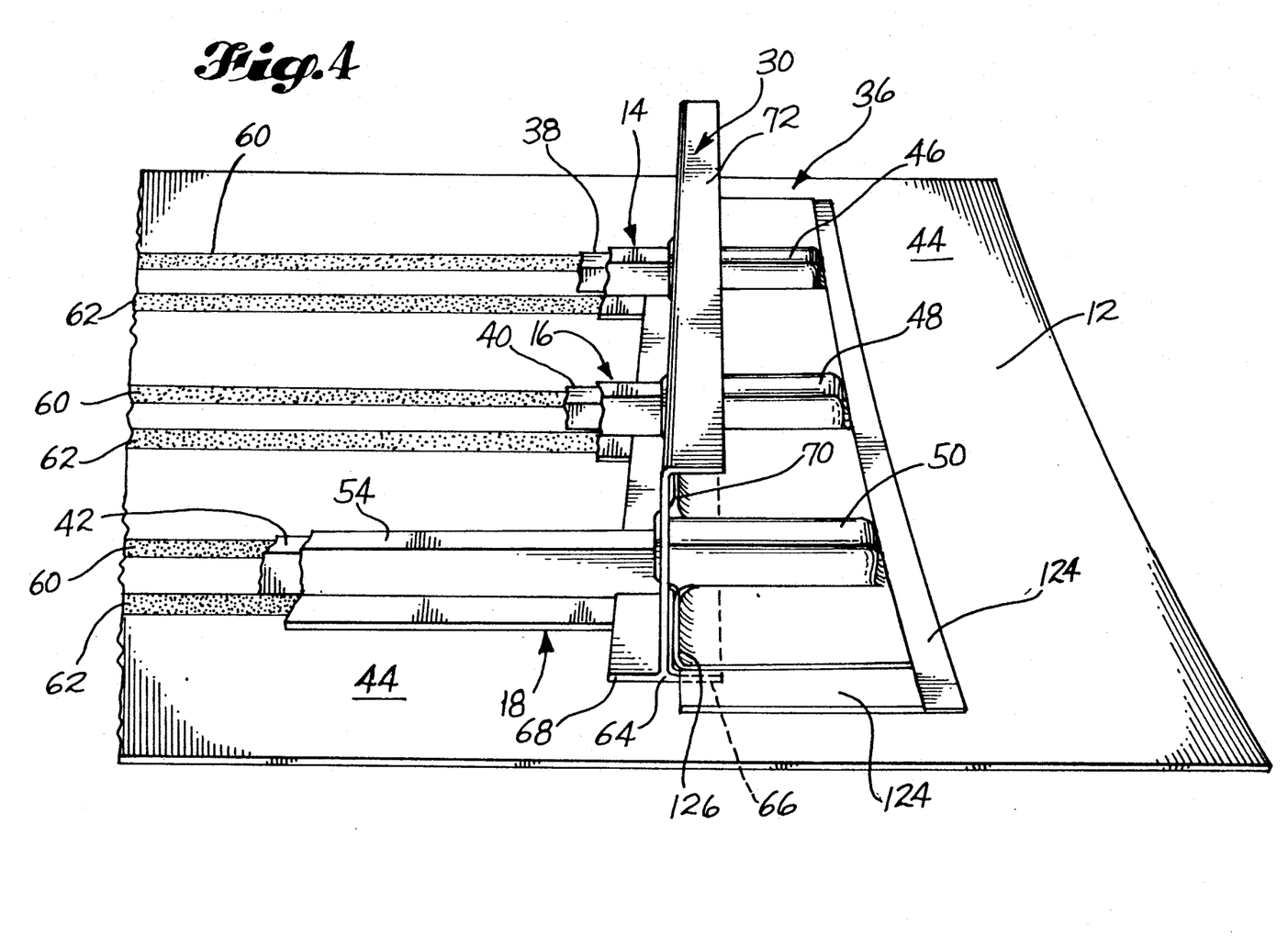
FIG. 4 is a fragmentary pictorial view of an end caul in accordance with the invention, and shows the caul in use during the initial stages of a panel-forming process.

Referring now to FIG. 4, an end caul, indicated generally at 36, is then located on the skin 12 over the ends of the stringers 14, 16, 18 and the underlying mandrels 38, 40, 42. The stringer and mandrel ends are received in part-forming recessed portions or areas 46, 48, 50 of the end caul 36, and are manipulated until they abut against the inner end wall 52 (see FIG. 7) of each one of such portions. Thus, the end caul 36 is used as a guide for locating the stringers 14, 16, 18 and mandrels 38, 40, 42 relative to the surface 44 of the skin 12, in addition to forming and curing the stringers as will be further described below.

Each stringer 14, 16, 18 is more or less conventional in cross-section, and has a top surface or cap 54, and oppositely-extending side edges or flanges 56, 58 (see FIG. 1). As the skilled person would know, each stringer 14, 16, 18 would typically be bonded to the surface 44 of skin 12 by adhesive strips 60, 62. Such strips are positioned so that they will run directly underneath and along the length of the stringer side edges 56, 58, and they are placed on the skin sheet surface 44 prior to placement of the stringers 14, 16, 18. Alternatively, in situations where "green" stringers are co-cured with a green panel, these components may be bonded without the use of a separate layer of a bonding substance.

Figure 12:
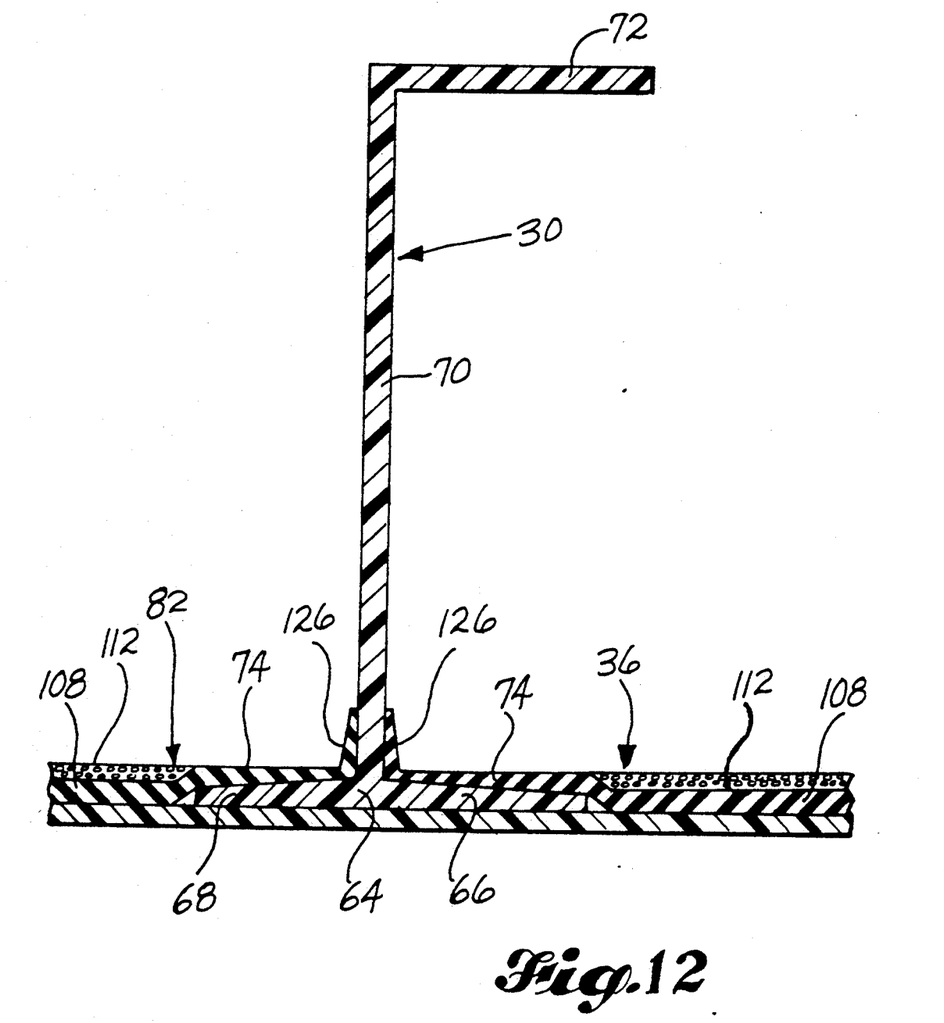
FIG. 12 is a cross-sectional view of the same frame member, but is taken along line 12—12 in FIG. 10.

After the mandrels and stringers 38, 40, 42, 14, 16, 18 are located on the skin surface 44 in the manner described above, one of the curved frames 30 is located over the stringers 14, 16, 18. Referring now to FIG. 12, each frame 26, 28, 30 consists of the following: a base portion 64 with oppositely-extending flanges 66, 68; an upwardly-extending vertical web portion 70; and a horizontal top flange 72. When the first frame 30 is placed onto the skin sheet 44, one of its base flanges 66 is positioned so that it underlaps a leading edge 74 of the end caul 36.

Figure 5:
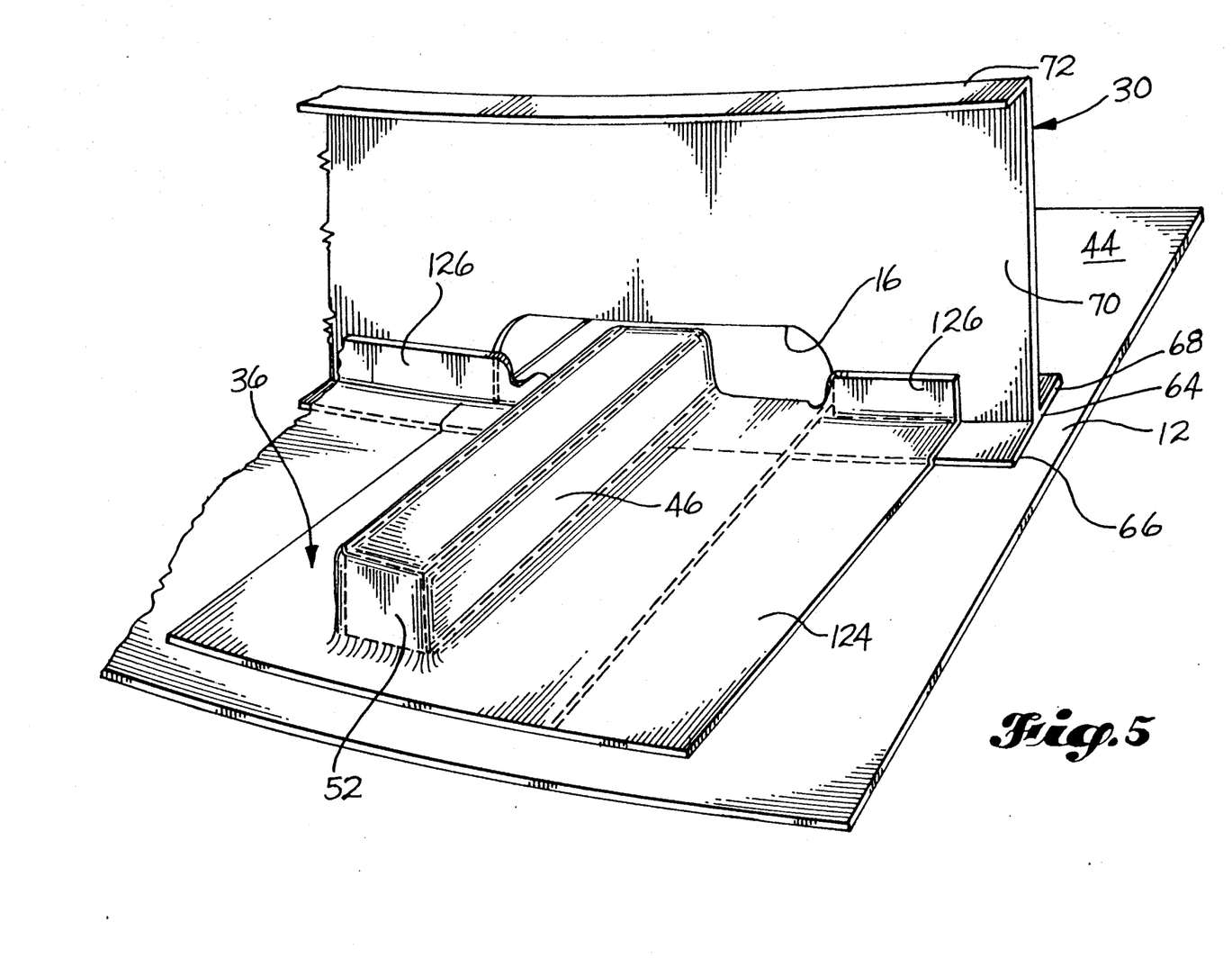
FIG. 5 is an enlarged fragmentary pictorial view of a corner section of the end caul shown in FIG. 4.
Figure 11:
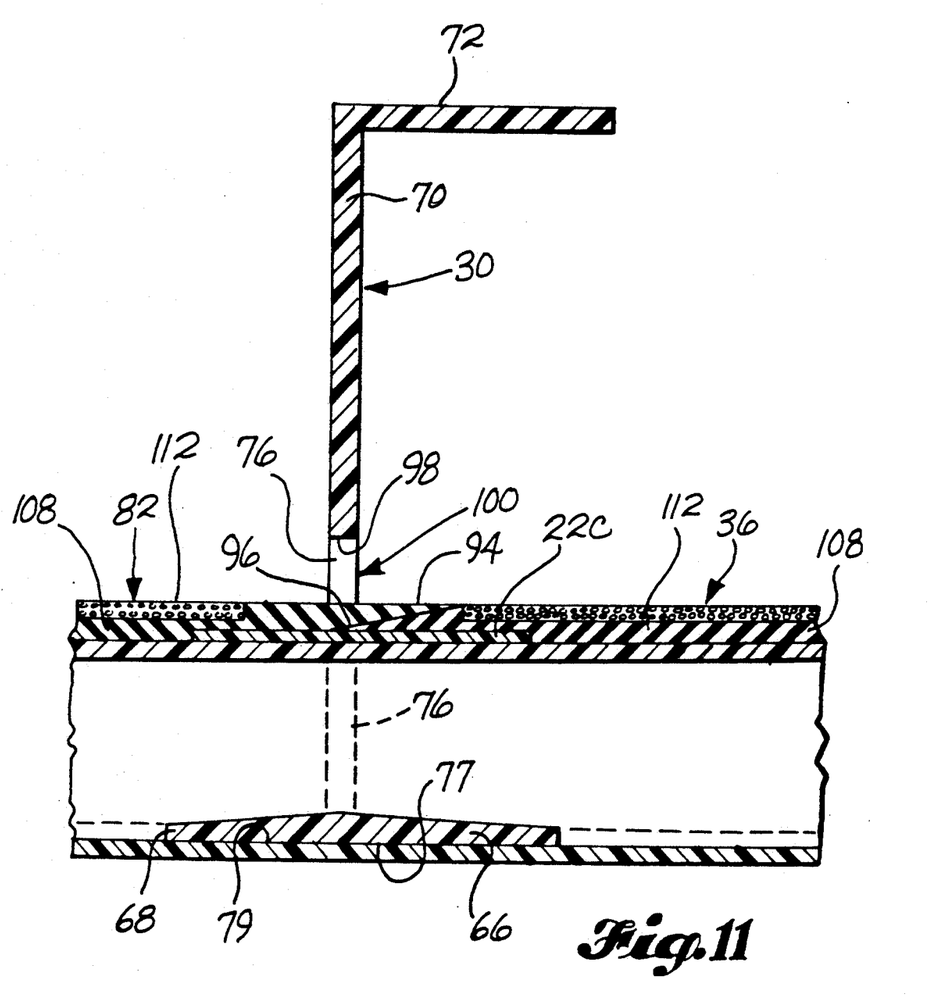
FIG. 11 is a cross-sectional view of a frame member taken along line 11—11 in FIG. 10.

Referring now to FIG. 5, in preferred form, each frame 26, 28, 30 has a stringer opening or "mouse hole" 76 which creates a recess in the frame for placing it crosswise over the stringers 14, 16, 18. The mouse holes 76 permit the base portion 64 of the frame 30 to come into direct contact with the panel skin 44, along most of the length of the frame. Referring to FIG. 11, prior to placement of the frame 30 on the skin 12, a layer of adhesive is placed between the contacting frame and panel surfaces 77, 79. The adhesive bonding substance is similar to adhesive layers 60, 62 previously described above (see FIG. 4), which underlie the stringers 14, 16, 18. As with the stringers, the adhesive layer is positioned on the panel skin 44 prior to placement of the frame 30, and extends substantially between and along the entire length of the contact area between the frame and skin.

After laying the first frame 30 over the stringers 14, 16, 18, the pressure bridges 20c, 22c, 24c are then located over the stringers in the regions defined underneath the frame mouse holes 76. The purpose and function of the pressure bridges will be further described later.

Referring now to FIG. 10, a second caul 82, similar in construction to the end caul 36 just described, is laid over the other base flange 68 of beam 30, and over the stringers 14, 16, 18, as well. This is followed by placing a second frame 28 over the stringers 14, 16, 18, in the same manner as was just described above with respect to the first frame 30. Pressure bridges 20b, 22b, 24b are likewise positioned underneath corresponding mouse holes 76, in the second frame 28 (see FIG. 1). This process is continued until all of the frames 26, 28, 30 and pressure bridges 20, 22, 24 are located on the surface 44 of the skin sheet 12.

As is apparent from FIG. 10, the first and second frame members 30, 28 define a stiffened panel section between them. The end caul 36 is positioned on the right-hand side of the first frame 30, although it is shown in partial section. The second caul 82 extends from one frame 30 to the next 28, and completely covers the exposed outer surfaces of both the uncured stringers 14, 16, 18, and the uncured surface 44 of the skin panel 12. Since, as was mentioned above, the frames 30, 28, 26 are otherwise fully cured prior to placement upon the skin panel 12, it becomes possible to place a vacuum bag directly over both the frames and cauls, without any intervening or intermediate materials between them. It may nevertheless be desirable to use some of such materials to produce a good vacuum underneath the bag.

Figure 13:
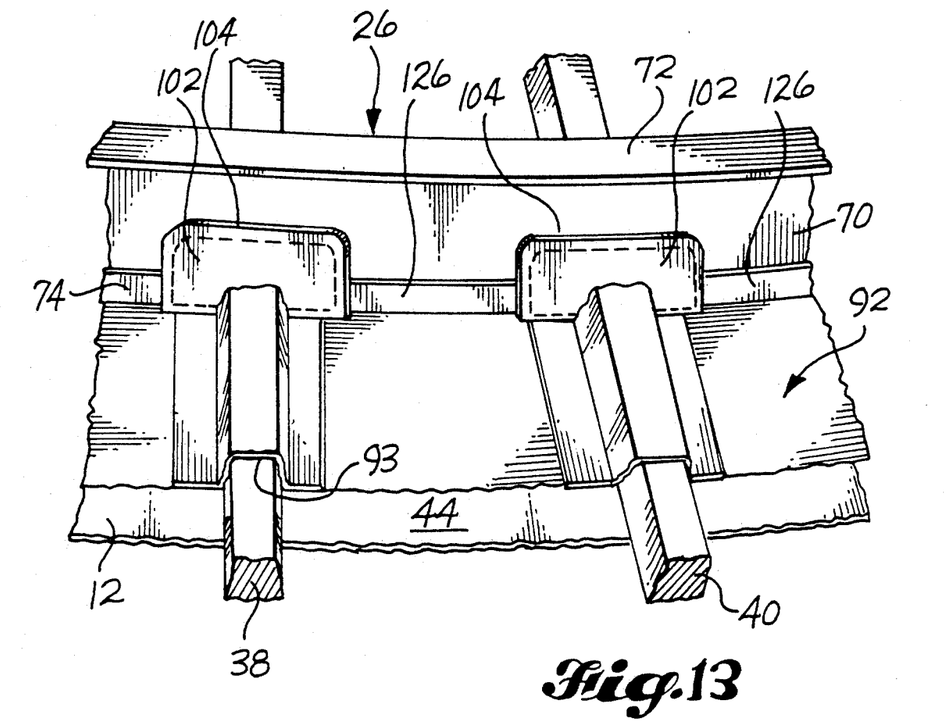
FIG. 13 is a pictorial view of another end caul in accordance with the invention, such caul being placed into use during a latter stage of the panel-forming process.

A total of four cauls 36, 82, 90, 92 (see FIG. 21) are required to cover the length of the stringers 14, 16, 18. The first or end caul 36 and the second caul 82 were just described. The third caul 90 is positioned between the second and third frames 28, 26. The fourth, or other end caul 92, covers the other ends of the stringers 14, 16, 18 and the mandrels 38, 40, 42. It is best seen in FIG. 13.

Figures 6, 7:
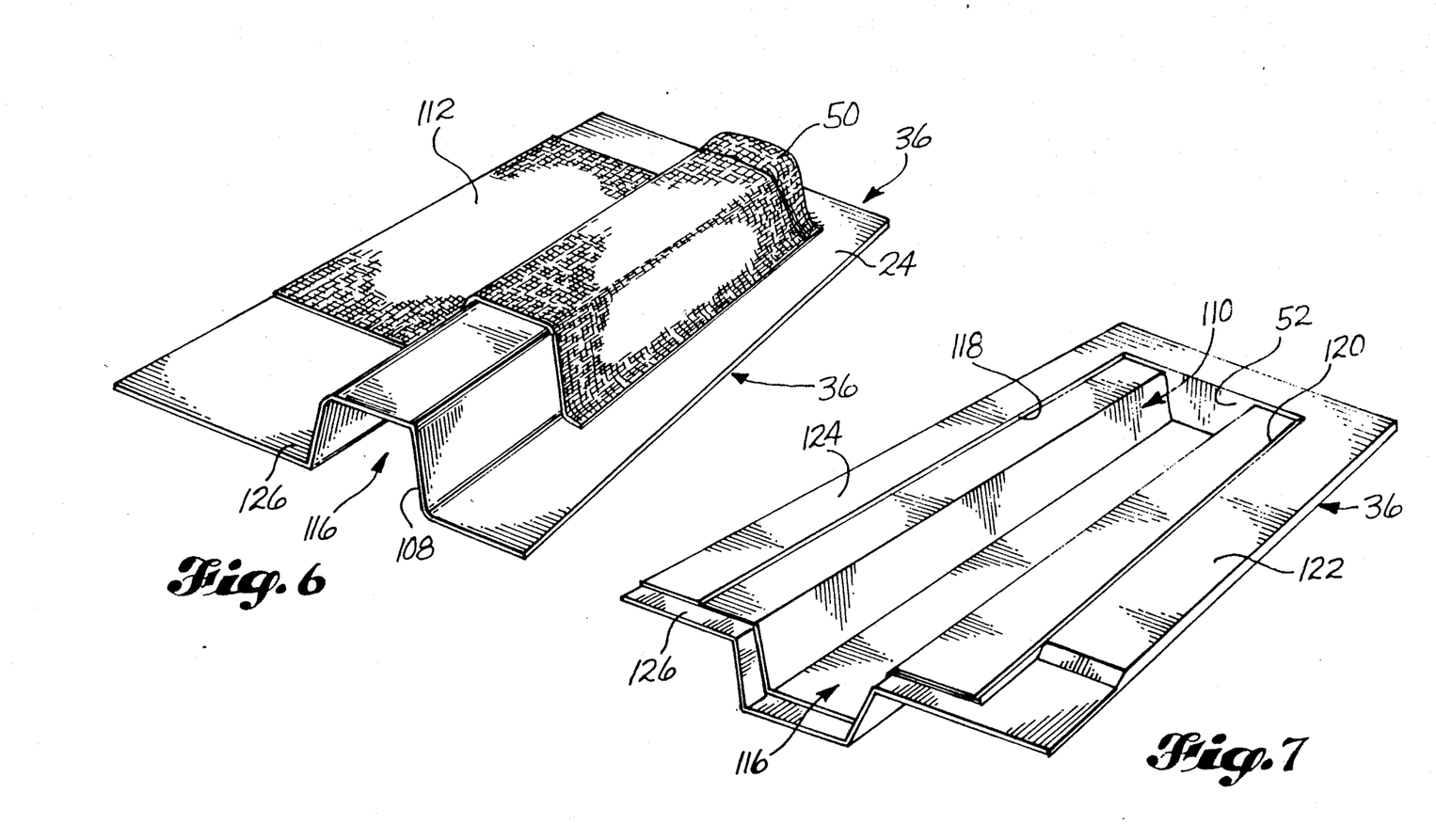
FIG. 6 is a fragmentary pictorial view of a corner section of the end caul shown in FIGS. 4 and 5.
FIG. 7 is a view like FIG. 6, but shows the underside of the caul.

Directing attention there, it can be seen that the other end caul 92 has open ends 93 which permit the mandrels to extend beyond the end of the skin sheet 12. The mandrels 38, 40, 42 will most likely expand during the heating process which makes up curing and bonding the various panel components described above. Therefore, it is probably preferable to leave the ends of end caul 92 open, to enable the mandrels 38, 40, 42 to expand as needed. Nevertheless, it would probably be possible to construct the other end caul 92 in the same fashion as the first end caul 36. That is to say, it could have closed ends like end wall 52 of caul 36 as shown in FIG. 7.

As will be further described below, the uncured stringers and skin 14, 16, 18, 12 are co-cured, and bonded together during such process. The frames 30, 28, 26 are co-bonded to the skin 12 at the same time. This is accomplished via a conventional vacuum bagging and heat forming process which would be familiar to the person skilled in the art. Prior to describing such process in greater detail, the purpose and function of the pressure bridges 20a-c, 22a-c, 24a-c will now be described.

As was mentioned above, each pressure bridge 20a-c, 22a-c, 24a-c, is fully cured at the time it is placed over one of the stringers 14, 16, 18. Further, it was described that each pressure bridge is placed under a mouse hole opening 76 underneath one of the frames 26, 28, 30.

Referring now to FIGS. 11 and 13, a portion of the edges 94, 96 of the two cauls on opposite sides of each frame extend through each frame mouse hole 76. They also cover the pressure bridge 22c underneath the mouse hole. In most cases, it is anticipated that the size of the mouse hole will be larger than both the width of the pressure bridge 22c and the stringer 16 which it covers. As is shown in FIG. 11, there will also be a gap, indicated generally at 100, between the mouse hole opening 76 and the caul edges 94, 96.

Referring now to FIG. 13, such gap 100 is filled with a silicon plug 102, or a plug made of a similarly flexible material, which protrudes slightly outwardly as shown at 104, from opposite sides of the frame 26. The plug 102 prevents a vacuum bag from pleating in areas that are adjacent the frame openings 76 and the intersections of the criss-crossing frames 26, 28, 30 and stringers 14, 16, 18. The pressure bridges function to distribute pressure from the bag onto the stringers in those areas which are immediately underneath frame openings 76. As the skilled person would realize, it would otherwise be difficult to position vacuum bagging material in such areas effectively.

Figure 19:
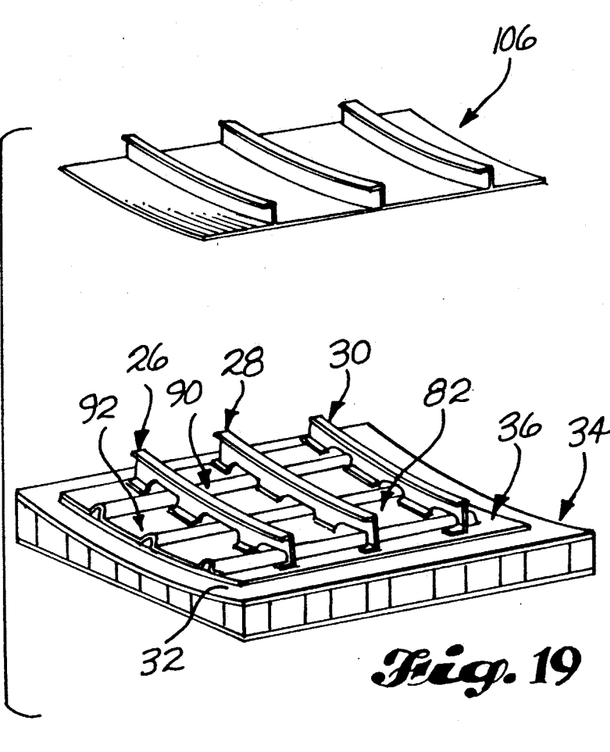
FIG. 19 is the fourth in a series of four sequential views, and shows placement of a vacuum bag over the criss-crossing pan 1 parts for curing and bonding.

Directing attention to FIG. 19, after all of the various panel components described above are assembled on top of skin surface 44, the entire assembly is covered with a conventional vacuum bag 106. The vacuum bag 106 extends beyond the outer perimeter of the skin 12, and contacts the surface 32 of tooling 34 around the entire perimeter of the skin 12. Thereafter, it is evacuated by conventional means, and is pulled down onto both the frames 26, 28, 30 and the cauls 36, 82, 90 92. Thereafter, the entire assembly is subjected to heat for a certain period of time in order to finally cure the stringers 4, 16, 18 and skin 12, and to bond the frames 26, 28, 30 and stringers 14, 16, 18 to the surface 44 of the sheet.

As mentioned above, it would not be necessary to have any intermediate materials between the vacuum bag and the four cauls 36, 82, 90, 92. However, the frames 26, 28, 30 will probably have sharp corners, and they may require a certain amount of covering material in order to protect the vacuum bag from being ripped at those locations. Nevertheless, placing such protective material would require a minimum amount of labor.

Figure 14:
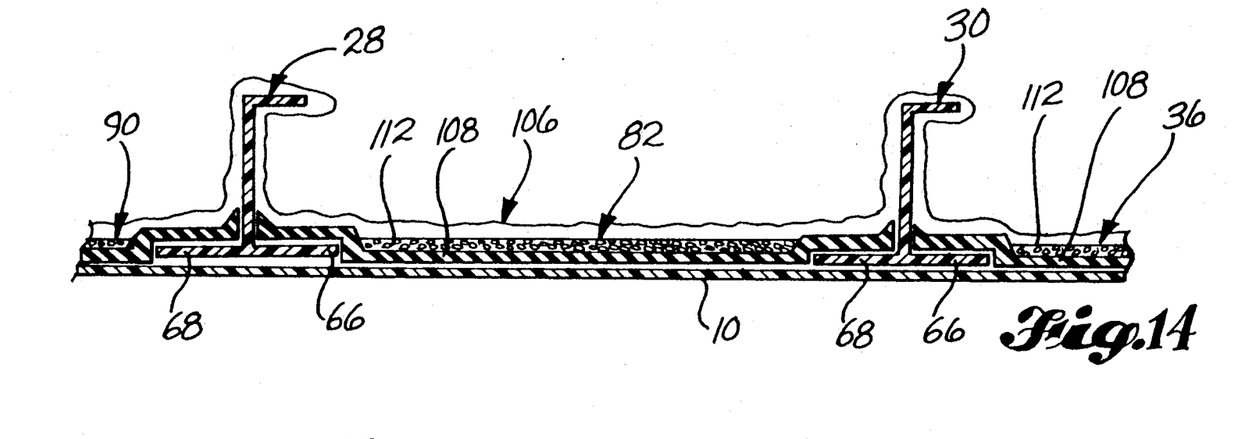
FIG. 14 is a side cross-sectional view of the crown panel shown in FIGS. 1 and 3 after its various parts have been positioned relative to each other, and after a vacuum bag has been placed over all of such parts, for curing certain parts, and for bonding all of the parts together.
Figure 15:
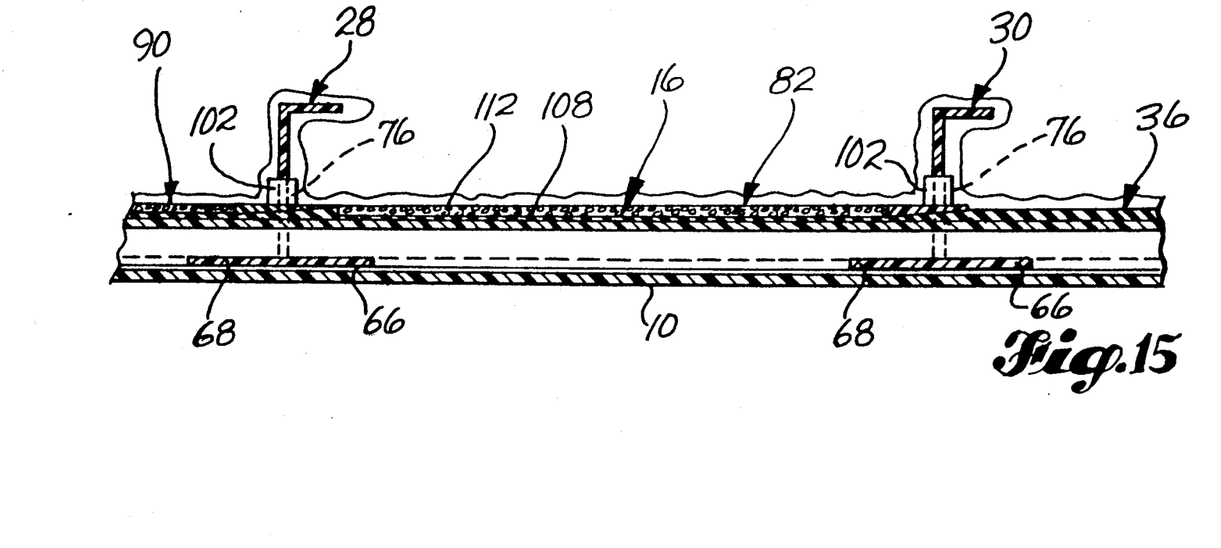
FIG. 15 is a side cross-sectional view like FIG. 14.

FIGS. 14 and 15 further illustrate what the above-described assembly looks like after the vacuum bag 106 is placed over the tooling surface. Preferably, the bag is of a silicon type, which would be familiar to the skilled person. As shown in FIG. 15, the silicon plugs 102 prevent portions of the bag 106 from entering into the gap 100 created by each frame opening 76, and thereby ensure that no bag pleating will occur in such areas. The construction of the cauls 36, 82, 90, 92 will now be described in greater detail.

Figure 8:
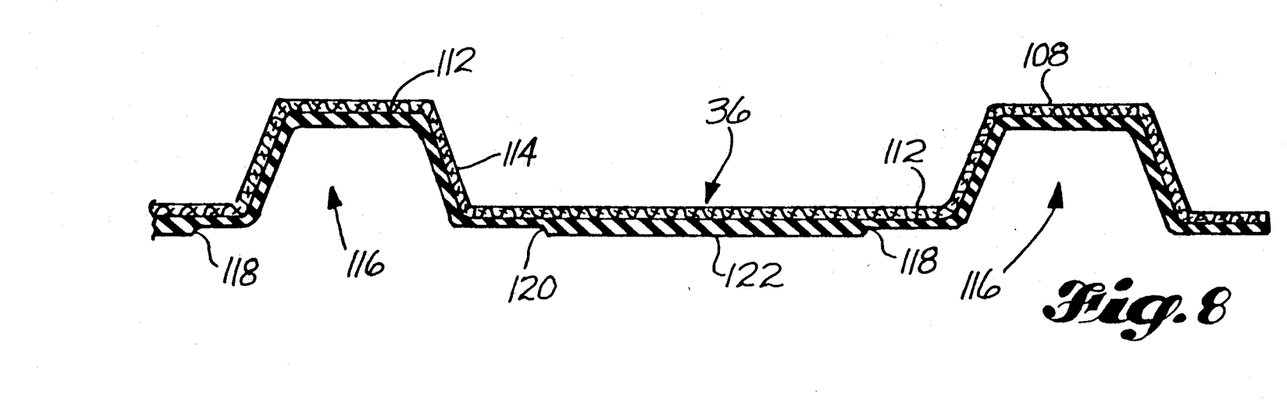
FIG. 8 is an enlarged cross-sectional view taken through a portion of the end caul shown in FIG. 4.
Figure 9:
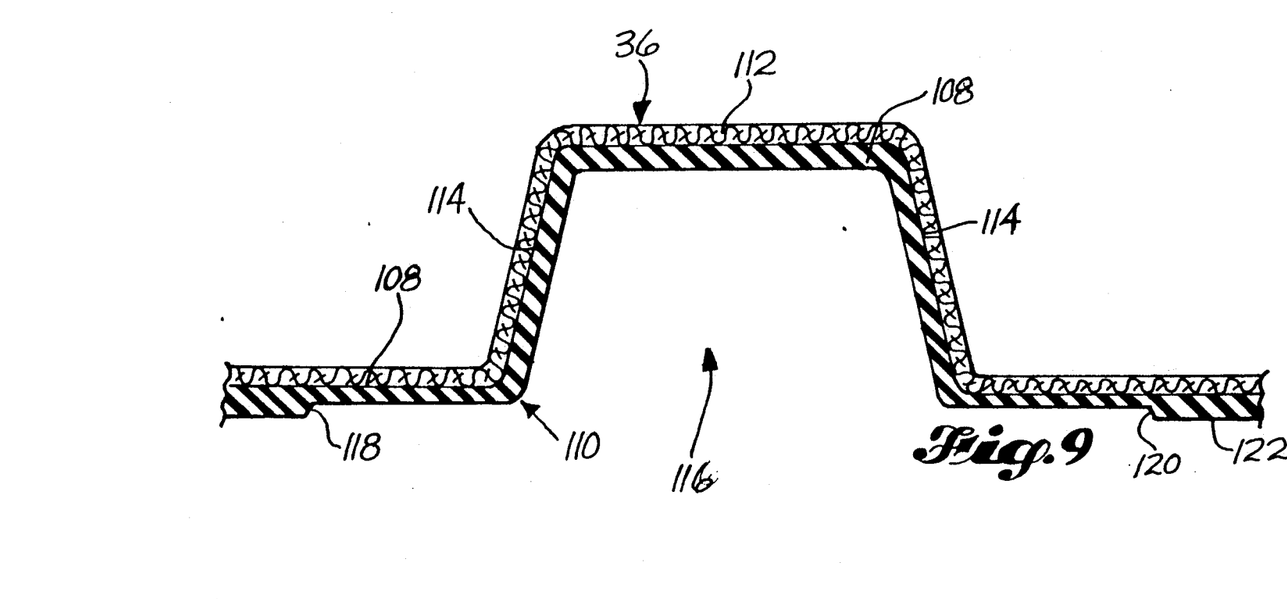
FIG. 9 is an enlarged view of a recessed area in the caul portion shown in FIG. 8, such area defining the "net" outer part shape of the stringer.

Referring to FIG. 6, as was described above, therein is shown a corner section of the first or end caul 36. The cross-sectional construction of all the cauls 36, 82, 90, 92 are shown in FIGS. 8 and 9. Each caul 36, 82, 90, 92 is constructed from primarily a single layer 108 of high-temperature or fluorelastomeric rubber. The lower surface 110 of the rubber layer 108 comes into direct contact with both the outer surfaces of the stringers 14, 16, 18, and the surface 44 of the panel sheet 12. Another layer of reinforcing material 112 is bonded directly to the opposite side 114 of the rubber layer 108.

Preferably, the reinforcing material 112 is made of the same composite material which makes up the various panel parts described above. That is to say, and as is well-known, composite materials generally have a low or nearly zero co-efficient of thermal expansion. Using a composite material as the backing or reinforcing material 112 on each caul thereby creates a caul that has the same co-efficient of thermal expansion (nearly zero).

The rubber and reinforcing layers 108, 112 together define a part-forming shape across the length and breadth of each caul, 36, 82, 90, 92. As was previously described with respect to the first end caul 36, each caul 36, 82, 90, 92 has a plurality of recessed areas, indicated generally at 116 in FIGS. 8 and 9, for receiving the outline of the stringers 14, 16, 18. Each recessed area has outer lateral edges 118, 120 which are sized so as to correspond with the outer extremities of each stringer flange 56, 58. Smooth areas 122 of the lower or inside surface 110 of rubber layer 108 press directly against the surface 44 of skin 12 adjacent the borders of the recesses 116.

The reinforcing layer 112 extends more or less continuously across the entire length and breadth of each caul 36, 82, 90, 92. It functions to reinforce and control shrinkage of the rubber layer 108, and to control part shape during the curing and bonding process. There may be situations where the reinforcing layer 112 may be discontinuous, in order to provide the caul with greater flexibility.

Referring now to FIGS. 5 and 6, the reinforcing layer 112 does not extend all the way to the outer perimeter of each caul. In other words, the outer edge 124 of each caul remains fully flexible and may consist entirely of the rubber layer 108. This is important in order to seal off each caul adjacent the base flanges 66, 68 and vertical web 70 of each frame 26, 28, 30. As is best seen in FIGS. 5 and 14, that edge portion 126 of each caul 36, 82, 90, 92 which is adjacent each frame is folded along the intersection of the frame's web and base, and extends upwardly along a certain length of the frame. In order to provide good sealing, the reinforcing layer 112 must be set back a certain distance from the perimeter of the caul, as shown in FIG. 6.

The flexible edge 124 of each caul seals off the stringers 14, 16, 18 from the bases 64 of the frames 30, 28, 26. Consequently, it prevents resin flow from the stringers from moving lengthwise along the frames. In preferred form, the flexible edge 124 of each caul extends around its entire periphery or perimeter. In some cases, it may be possible to cover such edges with a flexible cloth, so long as the edge 124 maintains sufficient flexibility to perform the above-described sealing function.

The skilled person, having the preceding description, along with working knowledge as to the formation and curing of composite materials, should be able to practice the invention with ease. Certain steps which normally make up any process involving the creation of composite parts may not have been described above, but would in any event be apparent to the skilled person.

For example, as the various panel parts are laid onto the skin 12, it may be desirable for a worker to use a heat gun to spot weld or tack the parts in place prior to application of the vacuum bag 106. Also, and referring to FIG. 3, it may be desirable to place a perimeter template 130 around the perimeter of the skin, in order to control resin flow there. It is not anticipated that such template 130 would normally be required. Further, and as the skilled person would realize, it may be desirable to place a "peel" ply between the skin 12 and tooling surface 32, and at other locations. Also, it may be possible that pre-cured composite parts may be used just as Well as "green" parts, or that all parts may be green at the time they are laid up together.

The preceding description should not be read in a limiting sense. Instead, the scope of the patent rights granted by this document is to be determined and defined exclusively by the patent claim or claims which follow, the interpretation of which is to be made in accordance with established doctrines of United States patent law.

What is claimed is:

1. A method for making a structural panel solely from composite materials, comprising:

placing a skin panel upon a tooling surface, wherein said skin panel is made of a composite material;

laying a plurality of stiffeners across said skin panel, with a layer of a bonding substance being positioned between and substantially along the length of contact of each stiffener with said skin panel, and wherein all of said stiffeners are made of a composite material;

laying a plurality of frame members across said skin panel crosswise of said stiffeners, wherein all of said frame members are made of a composite material and have openings sized to receive at least portions of said stiffeners which intersect said frame members, in a manner so that a majority of the length of each frame member directly contacts said skin panel, said frame members being spaced apart in a manner so as to define a stiffened panel section between every two frame members laid across said stiffeners, and with a layer of a bonding substance being positioned between and substantially along the length of contact of each frame member with said skin panel;

placing a plurality of cauls over said stiffeners, including placing a single caul over at least a portion of each stiffened panel section, said cauls defining the outer part shape of substantially all portions of said stiffeners which underlie said cauls;

placing a vacuum bag over the above assembly of said frame members, said cauls, said underlying stiffeners, and said skin panel; followed by evacuating said bag in a manner so that said bag presses said frame members against said skin panel and simultaneously presses against said cauls, consequently causing said cauls to press said stiffeners against said skin panel, and heat-curing said assembly to simultaneously cure said stiffeners and said skin panel, and to simultaneously bond said stiffeners and frame members to said skin panel, to thereby form said structural panel.

2. The method of claim including placing a cured pressure bridge over each stiffener at every location where a frame member intersects a stiffener, each pressure bridge being received within one of said frame member openings.

3. The method of claim 2, wherein each frame member opening is sufficiently large to create a gap between an edge of said opening and said pressure bridge, and including positioning a silicon plug within said opening, said plug protruding slightly outwardly from opposite sides of said gap above said pressure bridge.

4. The method of claim 1, including placing an elongated mandrel underneath each one of said stiffeners, for defining an inner part shape of each stiffener.

5. The method of claim 1, wherein each frame member is pre-cured at the time it is laid across said skin panel.

6. The method of claim 1, wherein each stiffener is uncured at the time it is laid across said skin panel.

7. The method of claim 1, wherein said skin panel is uncured at the time it is placed upon said tooling surface.

8. The method of claim 1, wherein each caul is characterized in that said caul includes at least one layer of high-temperature rubber having a first side surface shaped to press said stiffeners against said skin panel, and a reinforcing material bonded to the opposite side of said at least one rubber layer.

9. The method of claim 8, wherein each caul has means for preventing the resin in each stiffener from flowing outwardly toward said frame members during said curing and bonding process.

10. The method of claim 1, wherein each caul has substantially the same co-efficient of thermal expansion as the co-efficient of thermal expansion of said skin panel.

* * * * *

UNITED STATES PATENT AND TRADEMARK OFFICE
CERTIFICATE OF CORRECTION

PATENT NO. : 5,242,523
DATED : September 7, 1993
INVENTOR(S) : Kurtis S. Willden and Kenneth N. Goodno It is certified that error appears in the above-indentified patent and that said Letters Patent is hereby corrected as shown below:

Column 4, line 41, "pan 1" should be -- panel --.
Column 7, lines 31 and 32, "stringers 4" should be
    -- stringers 14 --.
Column 8, line 67, "Well" should be -- well --.
Claim 2, column 10, line 7, after "claim", insert -- 1 --.

Signed and Sealed this

Twenty-fifth Day of October, 1994

Attest:

BRUCE LEHMAN

*Attesting Officer*    *Commissioner of Patents and Trademarks*